United States Patent
Dünsbier

(10) Patent No.: US 10,601,231 B2
(45) Date of Patent: Mar. 24, 2020

(54) CHARGING DEVICE AND CHARGING METHOD FOR A HIGH VOLTAGE BATTERY OF A MOTOR VEHICLE

(71) Applicant: AUDI AG, Inglostadt (DE)

(72) Inventor: Stefan Dünsbier, Regensburg (DE)

(73) Assignee: AUDI AG, Ingolstadt (DE)

( * ) Notice: Subject to any disclaimer, the term of this patent is extended or adjusted under 35 U.S.C. 154(b) by 577 days.

(21) Appl. No.: 15/380,162

(22) Filed: Dec. 15, 2016

(65) Prior Publication Data
US 2017/0179738 A1 Jun. 22, 2017

(30) Foreign Application Priority Data
Dec. 18, 2015 (DE) .................. 10 2015 225 856

(51) Int. Cl.
*H02J 7/00* (2006.01)
*B60L 3/00* (2019.01)
*H02J 7/02* (2016.01)

(52) U.S. Cl.
CPC .......... *H02J 7/0026* (2013.01); *B60L 3/0046* (2013.01); *B60L 3/0069* (2013.01); *H02J 7/0045* (2013.01); *H02J 7/027* (2013.01); *B60L 2210/30* (2013.01)

(58) Field of Classification Search
CPC ........ B60L 3/0023; B60L 53/11; B60L 53/63; B60L 55/00; B60L 53/14; B60L 53/65;
(Continued)

(56) References Cited

U.S. PATENT DOCUMENTS 5,202,617 A * 4/1993 Nor .......................... B60L 3/12
320/130
2002/0113494 A1 8/2002 Winick et al.
(Continued)

FOREIGN PATENT DOCUMENTS

CN 102484368 A 5/2012
CN 103958262 A 7/2014
(Continued)

OTHER PUBLICATIONS

Chinese Office Action dated Feb. 3, 2019, in connection with corresponding CN Application No. 201611159948.7 (18 pgs., including machine-generated English translation).
(Continued)

*Primary Examiner* — Rexford N Barnie
*Assistant Examiner* — Terrence R Willoughby
(74) *Attorney, Agent, or Firm* — Maier & Maier, PLLC

(57) ABSTRACT

A charging device for securing a charging process of a high-voltage battery of a motor vehicle, which may be provided with a first connecting device for coupling a charging cable of a charging station external to a vehicle and a second connecting device for connecting the high-voltage battery. A diode element may be provided between the first connecting device and the second connecting device, which may be adapted to independently allow a charging current to flow from the charging stations into the battery and prevent a discharge current from flowing from the high-voltage battery to the charging station. The charging device may further include a monitoring device configured to detect a predetermined feedback situation, in which the diode element blocks the discharge current or prevents the discharge current from flowing through the diode element during a defect. When a feedback situation is detected, a predetermined emergency shutoff measure is taken.

18 Claims, 1 Drawing Sheet

(58) Field of Classification Search
CPC .. B60L 8/006; B60L 8/003; B60L 3/04; B60L 3/0069; B60L 2250/10; B60L 2240/549; Y02T 10/7072; Y02T 90/128; Y02T 10/7083; Y02T 90/169; Y02T 90/14; Y02T 90/121; Y02T 10/7005; Y02E 60/721; Y04S 30/14; Y04S 10/126
See application file for complete search history.

(56) References Cited

U.S. PATENT DOCUMENTS

| | | | | |
|---|---|---|---|---|
| 2012/0268075 | A1* | 10/2012 | Wolf | G01R 31/3832 320/132 |
| 2013/0314038 | A1* | 11/2013 | Kardolus | B60L 53/20 320/109 |
| 2014/0070773 | A1* | 3/2014 | Cottrill | H02J 7/0004 320/150 |
| 2014/0197790 | A1* | 7/2014 | Kaneyasu | B60L 11/1824 320/109 |
| 2014/0306659 | A1* | 10/2014 | Nakajima | B60L 53/14 320/109 |
| 2016/0241225 | A1* | 8/2016 | Ali | H03K 17/063 |
| 2018/0236888 | A1* | 8/2018 | Yabuuchi | B60L 3/0069 |

FOREIGN PATENT DOCUMENTS

| | | |
|---|---|---|
| DE | 296 08 208 U1 | 7/1996 |
| DE | 10 2011 006 096 A1 | 9/2012 |
| DE | 10 2011 118 716 A1 | 5/2013 |
| DE | 10 2014 210 648 A1 | 12/2015 |
| JP | H09-289741 A | 11/1997 |
| WO | 2010/109688 A1 | 9/2010 |

OTHER PUBLICATIONS

German Office Action dated Sep. 29, 2016 of corresponding application No. DE10 2015 225 856.4. 6 pgs.
Office Action dated Oct. 8, 2019, in corresponding Chinese Application No. 201611159948.7; 17 pages.

* cited by examiner

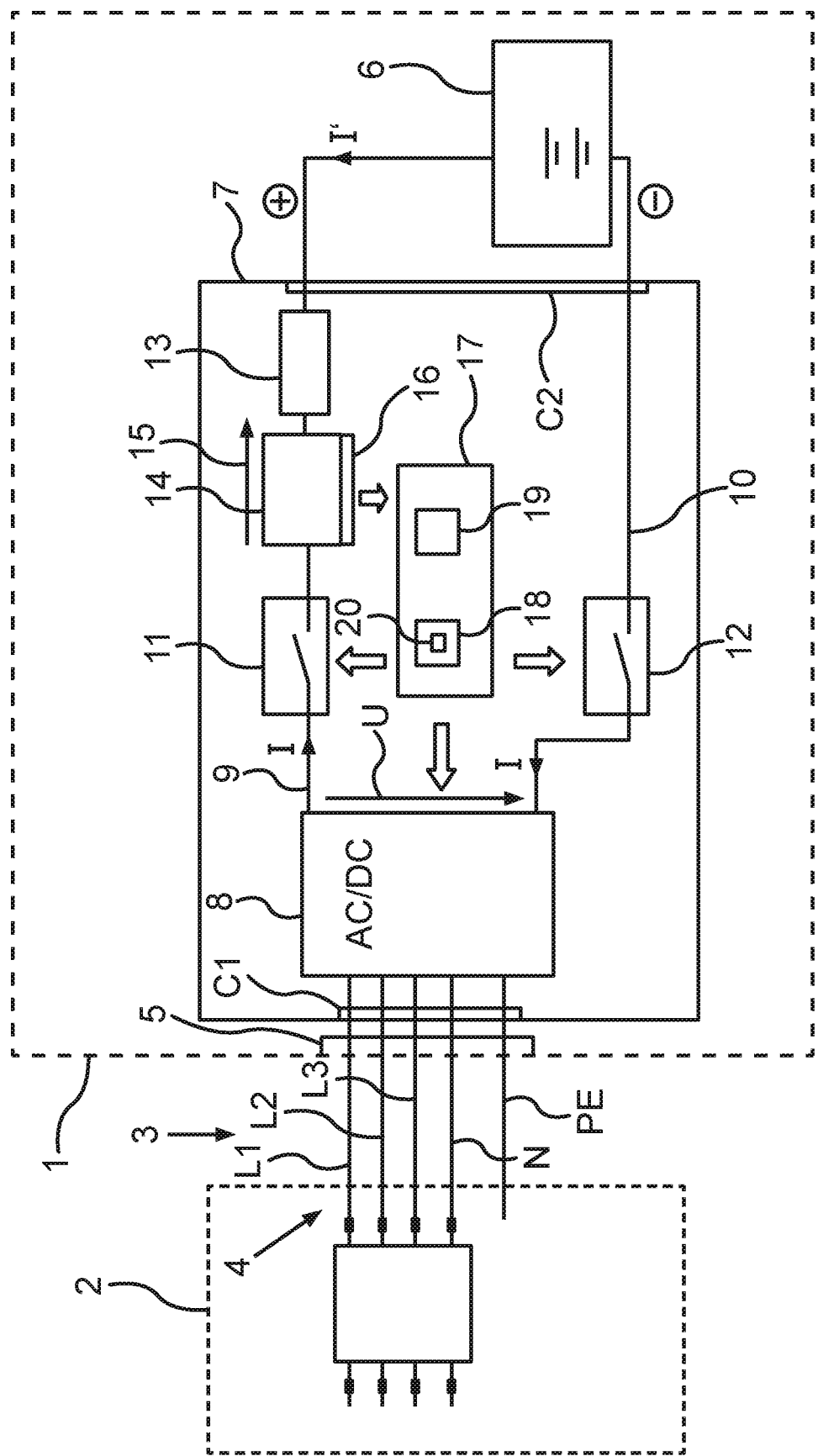

CHARGING DEVICE AND CHARGING METHOD FOR A HIGH VOLTAGE BATTERY OF A MOTOR VEHICLE

FIELD OF THE INVENTION

The invention relates to a charging device for a high-voltage battery of a motor vehicle. The term "high voltage" may be understood as an electrical voltage that is higher than 60 Volts.

BACKGROUND

A charging device for a motor vehicle is also referred to as an on-board charger (a charger on board). A similar charging device can be coupled with a charging cable for transmission of one-phase or multi-phase alternating voltage, for example through a charging socket. The charging device will then convert the alternating voltage into a direct voltage by means of which the high-voltage battery of the motor vehicle can be charged.

A motor vehicle charging device must also provide fault current protection. In particular, an all-current sensitive DC vault current detection (DC—direct current) of less than 6 milliamperes is prescribed according to IEC 62752 for charging of motor vehicles in order to safely prevent DC fault current residual current feedback of high voltage batteries in supply networks external to the vehicle. The required DC fault current detection is usually carried out with a fault current detector FI of type B, which must be provided in the three-phase current or AC voltage connection of the charging station. This means that providing such loading stations is cost-intensive.

German Patent Application No. DE 10 2011 118 716 A1 discloses a storage system for electrical energy, which is provided with a positive connection and with a negative connection, wherein protection is provided respectively to interrupt a charging current and a discharging current, and wherein in addition, a semiconductor switch is provided for bidirectional blocking. A flyback diode can be connected in parallel to the semiconductor switch to prevent overvoltage when inductivity is switched on.

German Patent No. DE 296 08 208 U1 discloses a battery charger that is provided with a constant current control circuit, in with which thyristors are connected in series to an electrical coil and generate, from alternating voltage, a DC charging current in cooperation with the coil.

German Patent Application No. DE 10 2011 006 096 A1 discloses a charging control system that is equipped with a first connecting device for connecting a charging cable of an external charging station located outside the motor vehicle, and with a second connection device for connecting a high voltage battery. For safe disconnection of the high voltage battery from the first connection device of the charging cable, a mechanical switch is provided both in the positive line and in the ground line of the charging device for galvanic interruption of the electrical connection.

SUMMARY

The objective of the invention is to secure the charging process against a DC fault current in a motor vehicle with a high-voltage battery.

Advantageous further developments of the invention are described in the description and FIGURE below.

The invention provides a charging device for a high-voltage battery of a motor vehicle. In the manner described, the charging device is equipped with a first connecting device for coupling a charging cable of an external charging station outside of the vehicle, and with a second connecting device for connecting a high-voltage battery.

In order to provide this charging device with protection against DC with a protection against DC residual current feedback, according to the invention, a diode element may be provided, which may be connected between the first connecting device and the second connecting device, and which may be adapted to allow independently a charging current from the charging station into the battery and to block a discharge current from the high voltage battery to the charging station. The diode element can be, for example, a single passive diode or a parallel circuit consisting of several passive diodes. The diode element can be connected, for example, in the positive line or the ground line for the direct current of DC charging current.

According to a further exemplary embodiment, a monitoring unit may be provided, which may be adapted to detect a predetermined feedback situation. The feedback situation describes the case in which the diode element blocks the discharge current, or when the discharge current flows through the diode element in case of a defect. Additionally, according to an exemplary embodiment, the monitoring unit may be adapted to trigger an emergency shutdown measure when a feedback situation is detected. In an exemplary embodiment, the monitoring unit may be a monitoring circuit, or may be an integrated circuit that has the described functionality, or may be or may include a microcontroller or a microprocessor.

According to an exemplary embodiment, advantageously, the actual charging device in the motor vehicle may prevent, in a redundant manner, a DC fault current (in the form of a direct current) from being able to flow from the high-voltage battery and through the charging cable to the first connecting device into the charging cable. First, the diode element may function to block a possible discharge current. Second, and on the other hand, the corresponding feedback situation may be detected through the monitoring unit, which may cause an emergency circuit to trigger an emergency feedback measure, if a discharge current from the battery is prevented by the diode element from flowing to the charging station, or if it flows through the defective diode element. According to some embodiments, the charging device may thus also has the additional advantage that an FI type B safeguard is not required. The motor vehicle can thus be charged even with a less secure charging station, without endangering the safety of the user.

Further advantages of embodiments of the present invention may also be understood.

According to one exemplary embodiment, the diode element may be provided with a positive diode circuit, which, in the case of positive voltage drop, switches through the diode element a controllable switching element to an electrically conductive switching state so as to allow charging with the charging current. Should there instead be a negative drop, the positive diode circuit switches the controllable switching element to an electrically blocking state through the diode element in order to block the discharge current. A positive voltage fall is obtained with this definition with a positive charging current. In an embodiment, the switching element can be, for example, a semiconductor switching element, in particular a transistor. An active diode circuit is per se known from prior art, for example in connection with active rectification under the keywords "active rectification". An active diode element has the advantage over a passive diode element in that it can be operated according to an ideal diode characteristic. Thus, it can enable switching between the conducting switching state and the blocking switching state with a voltage drop at 0 Volts, while with the passive diode element this will take place only at approximately 0.7 volts—and even then, volume resistivity will be present under conditions that are not ideal.

According to an exemplary embodiment, the charging device can be designed in a per se known manner to supply DC charging current with a positive line and a ground line, which may be electrically connected with a second connecting device in order to be connected to the high-voltage battery. According to a further exemplary embodiment, a mechanical switching element may be provided, respectively, in the plus line and/or in the ground line of the charging device. In an embodiment, said emergency shutdown measure may include setting the monitoring unit of each mechanical switching element to an electrically blocking state. In an exemplary embodiment, a mechanical switching element may be, for example, a protective contactor. Generally, a mechanical switching element may provide, in the electrically blocking state, galvanic separation. Such an embodiment may advantageously allow the charging device to carry out the emergency shutdown measure with its own components, so that the charging device does not need to rely on any other additional switching elements.

According to a further exemplary embodiment, a voltage measuring device may be provided to detect when electrical voltage drops in the diode element. Several advantageous embodiments of the invention can be provided by means of such a voltage measuring device. However, the measuring device itself in combination with the diode element already has the advantage that the charging device does not need to have an additional shunt resistant element to correlate the current intensity of the charging and/or of the discharge current.

According to a further exemplary embodiment, the feedback situation may be recognized on the basis of the voltage measuring device. In this case, the monitoring unit is configured to recognize the feedback situation based on detected voltage, so that it is detected, for example, in the described manner that the voltage drop throughout the diode element is a negative voltage or that it is 0 voltage. Here, the feedback situation can be detected, for example, as overvoltage in the high-voltage battery.

According to a further exemplary embodiment, the monitoring unit may be adapted to detect a defect of the diode element based on the detected voltage. According to an exemplary embodiment, the monitoring unit may specifically be adapted to detect a defect that can be recognized as a deviation of the voltage value of the detected voltage from a predetermined nominal value of a predetermined switching state of the charging device. In other words, a nominal value range may be determined for a predetermined switching state, and it may then be ascertained whether the detected voltage is in the nominal value range. In this manner, an undetermined, altered conduct of the diode element can be detected on the basis of the voltage drop, which may be due for example to a charging current or to another switching state. Therefore, an unknown defect of the diode element can also be detected. This may allow for particularly universal detection of a malfunction in a diode element.

According to another exemplary embodiment, the current controlling device may be adapted to detect a current intensity of the charging current on the basis of the detected voltage and a charging device may be controlled in order to set the current intensity of the charging current.

In an exemplary embodiment, a charging unit can be used as, for example, an active current converter, for example an active rectifier. The voltage measuring device may thus be used here in order to detect the nominal value of the charging current, which detects the current intensity without an additional shunt resistance element and on the basis of the diode element. Current intensity control can thus be realized or implemented by means of said voltage measuring device in a cost-effective manner.

In one exemplary embodiment, a charging device may be used for connecting a direct current charging station to the motor vehicle. However, in other exemplary embodiments, the first connecting device for connecting the charging cable may be provided with at least one electrical contact element for reception of the alternating voltage to generate the charging current. In other words, the charging device is designed to convert voltage from alternating voltage to direct voltage. In this manner, the charging device can be operating in existing charging stations provided with a connection to an alternating current power supply network.

In an exemplary embodiment, a motor vehicle that is provided with a high-voltage battery, for example a traction battery for a electric propulsion operations, may be provided along with an embodiment of a charging device. The first connecting device of the charging device may be connected to a charging contact or charging socket for insertion of the charging cable of the charging station described above. In some embodiments, a motor vehicle may be an automobile, in particular a car, or an electrically driven bicycle (so called E-bike).

In an exemplary embodiment, a method for securing a charging process of a high-voltage battery of a motor vehicle may also be described. Such a method may result in the operation of the charging device. A diode element connected between the first connecting device and the second connecting device may thus independently allow a charging current to flow from a loading station that is external to the motor vehicle into the high-voltage batter, and may block a discharge current from the high-voltage battery from entering the loading station. However, according to an exemplary embodiment, only one of the two situations can be present at the same time. A monitoring unit may detect a predetermined feedback situation, which may be a situation in which the diode element blocks the discharge current, or may be a situation in which the discharge current flows through the diode element in case of a defect. When such a feedback situation is detected, in an exemplary embodiment, the monitoring unit may trigger off a predetermined emergency shutoff measure, wherein a mechanical switch element is switched to the electrically blocking state to cause a galvanic disconnection of the high-voltage battery, for example in the manner described above, from the charging cable.

In some exemplary embodiments of the method for securing a charging process of a high-voltage battery of a motor vehicle, a charging device may have features that were already described in connection with embodiments of the charging device.

BRIEF DESCRIPTION OF THE DRAWINGS

An embodiment of the invention will be explained next.

FIG. 1 provides a schematic representation of an embodiment of the motor vehicle.

DETAILED DESCRIPTION

One or more exemplary embodiments may be further described in the following detailed description of the drawings. The components described in the embodiments represent individual embodiments having features which may be considered independently of each other. In addition, the embodiments described here can be also complemented by other, already described features of other exemplary embodiments.

FIG. 1 shows an exemplary embodiment of a motor vehicle 1, which has a stationary charging station 2 that is mounted externally in a vehicle. The motor vehicle 1 can be, for example, a car, in particular a personal automobile. This motor vehicle 1 may be connected through a charging cable 3 to the charging station 2. The charging station 2 can be configured, for example, as a charging station provided with charging posts. In electrical contact elements 4 of the charging cable 3 can be provided phases L1, L2, L3 of a three-phase alternating current voltage, which the charging station can receive from a public electrical supply network (not shown). In addition, a neutral conductor N and/or a protective conductor PE are provided in the charging cable 3. The charging cable 3 can be connected to a charging socket 5 of the motor vehicle 1, for example by being plugged in it.

A high-voltage battery 6 of the motor vehicle 1 can be charged with electrical energy by means of the charging station 2. For this purpose, the high-voltage battery 6 may be interconnected via a charging device 7 with the charging socket 5. In an exemplary embodiment, the charging device 7 may therefore be provided with a connecting device C1 for connecting to the charging socket 5. In some exemplary embodiments, the charging device 7 can be provided with a current converter or rectifier or AC-DC converter 8, through which alternating voltage phases L1, L2, L3 are converted into direct voltage U, which is provided between a positive line 9 and a ground line 10. The AC-DC converter 8 may represent a charging unit. The plus line 9 and the ground line 10 may transfer a charging current, I, from the AC-DC converter 8 into the high-voltage battery 6. According to an exemplary embodiment, the charging device 7 may be for this purpose equipped with a connecting device C2 for connecting the battery poles of the high-voltage battery 6. In order to switch on the charging current I, a mechanical switching element 11, 12 can be provided respectively in each of both lines 9, 10, which can be, for example, a protective contactor. According to an exemplary embodiment, a fuse 13, such as a pyroelectric fuse, may be provided as an emergency shutoff element.

According to an exemplary embodiment, the charging station 2 for the motor vehicle 1 may not need to be provided with a H type B fuse. The motor vehicle 1 itself may be provided through the charging device 7 with protection against a DC fault current from the high-voltage battery 6 for the charging station 2. According to an exemplary embodiment, a diode element 14 may be provided for this purpose in the charging device 7. In an embodiment, the diode element 14 may be, for example, an active diode circuit. In an embodiment, falling voltage 15 that is caused by the charging current 1 through the diode element 14 can be detected by a voltage measuring device 16, which can be configured in a per se known manner.

According to an exemplary embodiment, the charging device 7 can in addition be also provided with a control device 17, which may be or may include, for example, a microcontroller or a microprocessor, or an integrated circuit, for example as an ASIC (Application-Specific Integrated Circuit), or FPGA (Field Programmable Gate Array). In an embodiment, a monitoring unit 18 and a current regulating device 19 can be realized with the control device 17.

In an exemplary embodiment, the protection for the DC feedback may be realized with the diode element 14 itself, in that it prevents a discharge current I' from flowing from the high-voltage battery back to the charging station 2.

According to an exemplary embodiment, in parallel or in addition, the monitoring unit 18 may determine on the basis of the voltage 15 that is detected through the voltage monitoring device 16 whether a feedback situation 20 is in fact present. The monitoring criteria for recognizing a feedback situation 20 can be, for example, when the voltage 14 displays a negative voltage value or a voltage value of 0 Volts throughout the diode element 14; such a finding may indicate that a reverse current or discharge current I' either is blocked directly by the diode element 14, or that it flows through the diode element 14 because it is not blocked due to a defect. Here, the monitoring unit 18 may be activated so that, for example, the switching element 11, 12 will be switched from an electrically conductive state to an electrically blocking state. The cause of a discharge current I' may be, for example, that the battery voltage of the high-voltage battery 6 is greater than the charging voltage of the charging station 2, which is to say greater than then resulting direct current voltage U.

In addition, according to an exemplary embodiment, an undetected, altered conduct of the diode element 14 can be also detected by the monitoring unit on the basis of the detected voltage 15 as an emergency shutoff measure of the change in the switching state of switching elements 11, 12, in which an electrically blocking state will be triggered. The monitoring unit 18 can be redundantly designed in order to reach a higher ASIL level (ASIL—Automotive Safety Integrity Level).

The diode element 14 may have a specific, reproducible conduct with respect to voltage drop over current, so that the charging current I can be measured instead of the otherwise customary shunt in the manner described above. It is thus advantageous when the regulating device 19 is used to regulate the current intensity of the charging current I by means of the AC-DC converter 8 on the basis of the voltage 15 detected by the voltage measuring device 16.

According to an exemplary embodiment wherein the diode element 14 is designed as an active diode circuit, an additional advantage is obtained, namely that a DC fault current flow obtained from the high-voltage battery 6 to the AC-DC converter and the connected charging infrastructure can be actively blocked all the way to the microampere level.

According to an exemplary embodiment, in order to provide protection against a DC fault current for the motor vehicle 1, and specifically for the charging device 7, the only additional expense that may be required may be the diode element 14 with the semiconductor elements, because the control device 17 and the mechanical switching elements 11, 12 can also be used in order to realize the charging function according to the invention. The expense related to providing the diode element 14 can be cost-effectively compensated for, because, according to an exemplary embodiment, an expensive power shunt for current measurement can be eliminated because the current measurement is now made possible via the diode element 14 in the manner described above.

Since, in some exemplary embodiments, the design may now be independent of the protection mechanism of the charging station 2, the charging infrastructures existing in any country can be safely used because the safety can be ensured through the motor vehicle itself in the form of its charging device 7.

Overall, the exemplary embodiments show that a high-voltage direct current charger can be provided with redundant DC fault current protection and with integrated current measurement.

The invention claimed is:

1. A charging device for a high-voltage battery of a motor vehicle, comprising:
a first connecting device for coupling a charging cable of a charging station external to the vehicle; and
a second connecting device for connecting a high-voltage battery,
wherein a diode element is connected between the first connecting device and the second connecting device, which is adapted to independently allow charging current to flow from the charging station into the high-voltage battery and to prevent discharge current from flowing from the high-voltage battery into the charging station,
wherein a monitoring unit is provided, which is adapted to detect a predetermined feedback situation, during which the diode element blocks the discharge current or the discharge current flowing during a defect, and which is configured to trigger a predetermined emergency shutdown measure when the feedback situation is detected, and
wherein the monitoring unit is included in the charging device of the motor vehicle, and the monitoring unit is independent of the charging station in protecting the charging device of the motor vehicle.

2. The charging device according to claim 1, wherein the diode element is provided as an active diode circuit, which switches a controllable switching element with a positive voltage drop through the diode element to an electrically conductive switching state to allow the charging current to flow, and with a negative voltage drop switches it to an electrically blocking state through the diode element in order to block the discharge current.

3. The charging device according to claim 1, wherein a mechanical element is provided respectively in one of a positive line or a ground line of the charging device; and
wherein the emergency shutoff measure comprises switching each mechanical switching element to an electrically blocking state with the monitoring unit.

4. The charging device according to claim 2, wherein a mechanical element is provided respectively in one of a positive line or a ground line of the charging device; and
wherein the emergency shutoff measure comprises switching each mechanical switching element to an electrically blocking state with the monitoring unit.

5. The charging device according to claim 1, wherein a voltage measuring device is provided for detection of falling electrical voltage throughout the diode element.

6. The charging device according to claim 2, wherein a voltage measuring device is provided for detection of falling electrical voltage throughout the diode element.

7. The charging device according to claim 3, wherein a voltage measuring device is provided for detection of falling electrical voltage throughout the diode element.

8. The charging device according to claim 4, wherein a voltage measuring device is provided for detection of falling electrical voltage throughout the diode element.

9. The charging device according to claim 5, wherein the monitoring unit is configured to recognize the feedback situation on the basis of the detected voltage.

10. The charging device according to claim 5, wherein the monitoring device is configured to recognize on the basis of the detected voltage a defect of the diode element as a deviation of a voltage value of the detected voltage from a predetermined nominal value range with a predetermined switching state of the charging device.

11. The charging device according to claim 9, wherein the monitoring device is configured to recognize on the basis of the detected voltage a defect of the diode element as a deviation of a voltage value of the detected voltage from a predetermined nominal value range with a predetermined switching state of the charging device.

12. The charging device according to claim 5, wherein a current regulating device is configured to control a current intensity of the charging current on the basis of detected voltage so as to set the current intensity of the charging current.

13. The charging device according to claim 9, wherein a current regulating device is configured to control a current intensity of the charging current on the basis of detected voltage so as to set the current intensity of the charging current.

14. The charging device according to claim 10, wherein a current regulating device is configured to control a current intensity of the charging current on the basis of detected voltage so as to set the current intensity of the charging current.

15. The charging device according to claim 11, wherein a current regulating device is configured to control a current intensity of the charging current on the basis of detected voltage so as to set the current intensity of the charging current.

16. The charging device according to claim 1, wherein the first connecting device is provided with at least one electrical contact element for reception of respective alternating voltage in order to generate the charging current.

17. A system for charging a motor vehicle, comprising:
a motor vehicle having a high-voltage battery; and
a charging device comprising:
a first connecting device for coupling a charging cable of a charging station external to the vehicle; and
a second connecting device for connecting a high-voltage battery,
wherein a diode element is connected between the first connecting device and the second connecting device, which is adapted to independently allow charging current to flow from the charging station into the battery and to prevent discharge current from flowing from the high-voltage battery into the charging station,
wherein a monitoring unit is provided, which is adapted to detect a predetermined feedback situation, during which the diode element blocks the discharge current or the discharge current flowing during a defect, and which is configured to trigger a predetermined emergency shutdown measure when the feedback situation is detected,
wherein a first connecting device of the charging device is interconnected with a charging socket for plugging in a charging cable, and
wherein the monitoring unit is included in the charging device of the motor vehicle, and the monitoring unit is independent of the charging station in protecting the charging device of the motor vehicle.

18. A method for securing a charging process of a high-voltage battery of a motor vehicle, wherein a diode element connected between a first connecting device and a second connecting device independently allows a charging current to flow from a charging station external to a vehicle to flow into the high-voltage battery and prevents a discharge current from flowing from the high-voltage battery into the charging station, and a monitoring unit detects a predetermined feedback situation, in which the diode element blocks the discharge current or prevents the discharge current from flowing through the diode element during a defect thereof, and triggers a predetermined emergency shutdown measure when a feedback situation is detected, and wherein the monitoring unit is included in the charging device of the motor vehicle, and the monitoring unit is independent of the charging station in protecting the charging device of the motor vehicle.

* * * * *